Figure 2:
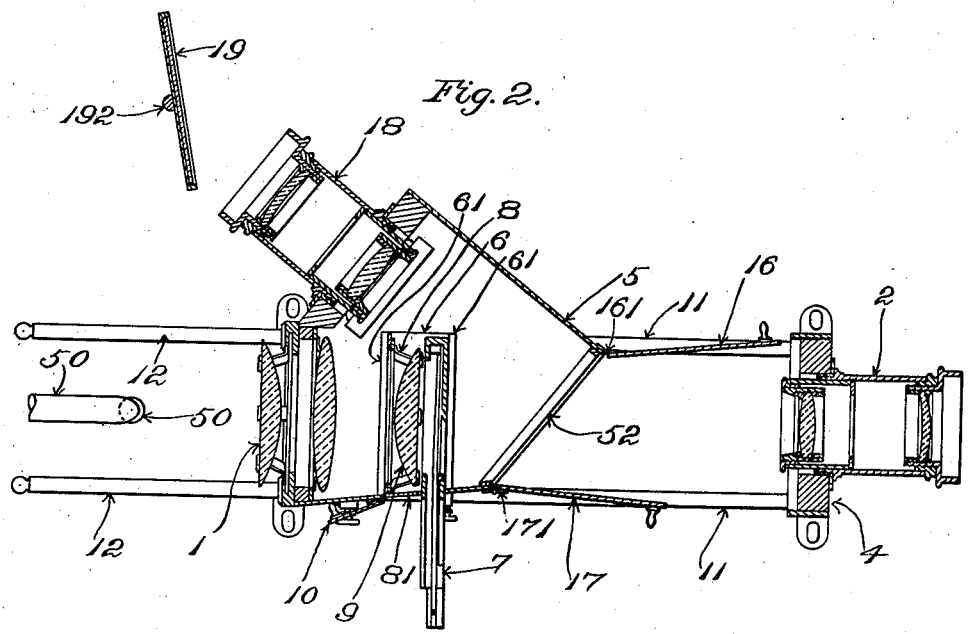

No. 782,586. PATENTED FEB. 14, 1905.
A. T. THOMPSON.
OPTICAL PROJECTION APPARATUS.
APPLICATION FILED NOV. 21, 1904.

3 SHEETS—SHEET 1.

Witnesses:
Oscar F. Hill
Aline Tarr

Inventor:
Albert T. Thompson
by Chas. F. Randall
Attorney.

No. 782,586. PATENTED FEB. 14, 1905.
A. T. THOMPSON.
OPTICAL PROJECTION APPARATUS.
APPLICATION FILED NOV. 21, 1904.

3 SHEETS—SHEET 2.

Witnesses:
Oscar F. Hill
Aline Carr

Inventor:
Albert T. Thompson
by Chas. F. Randall
Attorney.

No. 782,586. PATENTED FEB. 14, 1905.
A. T. THOMPSON.
OPTICAL PROJECTION APPARATUS.
APPLICATION FILED NOV. 21, 1904.

3 SHEETS—SHEET 3.

Witnesses:
Oscar F. Hill
Aline Tarr

Inventor:
Albert T. Thompson
by Chas. F. Randall
Attorney.

No. 782,586. Patented February 14, 1905.

UNITED STATES PATENT OFFICE.

ALBERT T. THOMPSON, OF BOSTON, MASSACHUSETTS.

OPTICAL PROJECTION APPARATUS.

SPECIFICATION forming part of Letters Patent No. 782,586, dated February 14, 1905.

Application filed November 21, 1904. Serial No. 233,610.

*To all whom it may concern:*

Be it known that I, ALBERT T. THOMPSON, a citizen of the United States, residing at Boston, in the county of Suffolk, State of Massachusetts, have invented a certain new and useful Improvement in Optical Projection Apparatus, of which the following is a specification, reference being had therein to the accompanying drawings.

The invention consists in general in an apparatus of improved and novel construction which is adapted to be employed both for projection from transparent optical material—such, for instance, as lantern-slides—and for the projection of images from opaque optical subjects or material—such as photographs, lithographs, drawings, maps, reading-matter, and, in fact, all objects not exceeding in their cross-sectional measurement the capacity of the apparatus—in their true form and color.

The invention comprises also improvements in apparatus for the projection of images from opaque optical subjects or material and which, if desired, may be used for that purpose alone independently of lantern-slide projection.

An apparatus embodying the invention in its more complete form comprises lantern-slide projection devices or the analogue thereof adapted for use in connection with transparent optical subjects or material and which devices may be of usual or approved character for the purpose, the said devices embracing, essentially, a lighting means, such as an electric or other lamp or a mirror for reflecting solar light, a condenser-lens, a slide-stage, a slide-carrier, or an analogous stage and carrier, and an objective-lens, which last may be termed hereinafter the "main" objective-lens; also, one or more holders for the photographs or other opaque optical subjects or material from which reflected images are to be projected, with a secondary objective-lens for the projection of such images and in the more complete embodiment of the invention with a mirror receiving the image from the secondary objective-lens and reflecting it upon a screen, which latter may be the same that receives the image from the main objective-lens in lantern-slide or other analogous projection. The said holder or each thereof is mounted movably in a location intermediate the condenser-lens and main objective-lens.

In the inoperative position of the holder or holders it or they is or are retracted from the path of the beam of light which passes from the condenser-lens to the main objective-lens. When the holder or holders is or are thus retracted, the apparatus may be employed in the manner in which it is customary to employ apparatus for projecting from slides or analogous transparent optical material. When the apparatus is to be used for the production of reflected images from opaque objects, the slide-carrier or the like is removed and the holder or one thereof is placed in its operative position, the picture or other object supported thereby being thus caused to intersect at an angle the beam of light intermediate the condenser-lens and the main objective-lens and being thereby illuminated. The reflection from the said picture or other object passes through the secondary objective-lens and is projected by the latter, preferably upon the mirror aforesaid, the said mirror being usually placed at an angle to the axis of the said secondary objective-lens, so as to reflect the image forward in the same general direction as the image which is projected by the main objective-lens. The apparatus is adapted to project images from transparent optical material and opaque optical material in alternating succession in any desired order forward toward a screen in front of the apparatus and when the reflecting-mirror is employed arranged as just stated without it being necessary to completely reverse or rotate the latter when the change is made from the one kind of projection to the other. When it is not desired to provide for lantern-slide projection, the main objective-lens, the stage, and the slide-carrier may be omitted.

I have illustrated an embodiment of the invention in the drawings, in which—

Figure 1:
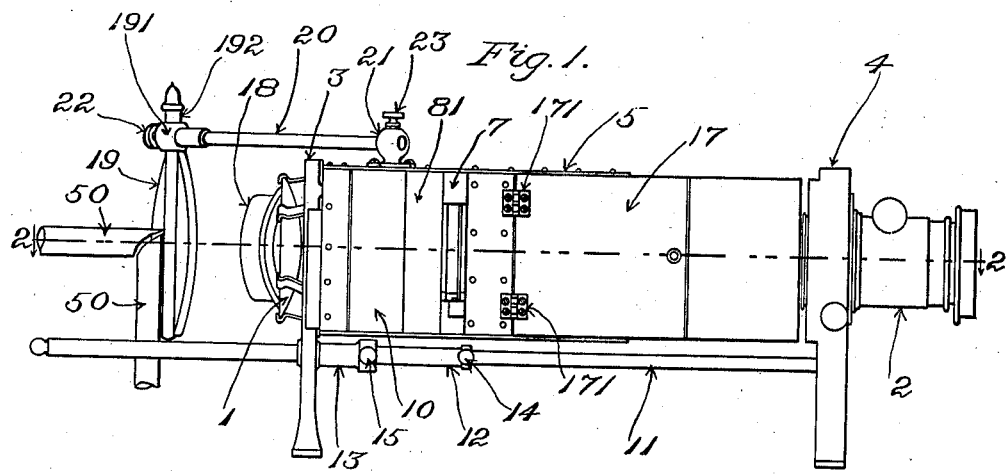
Figure 4:
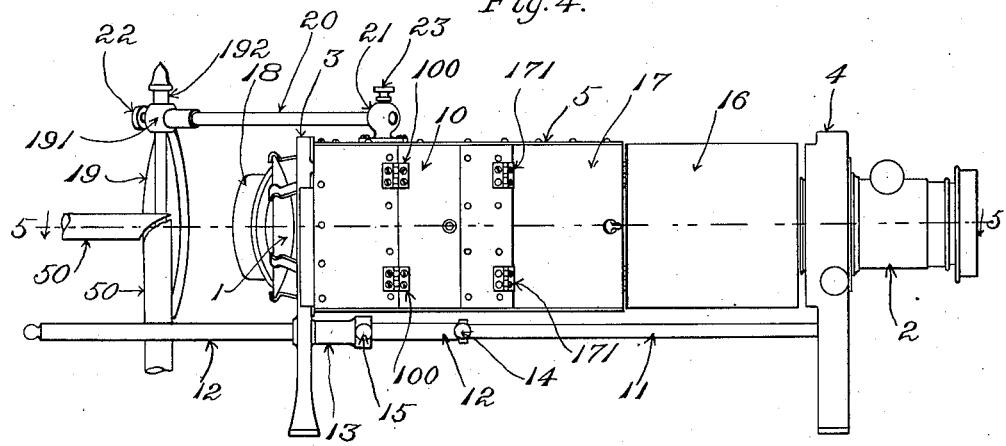
Figure 3:
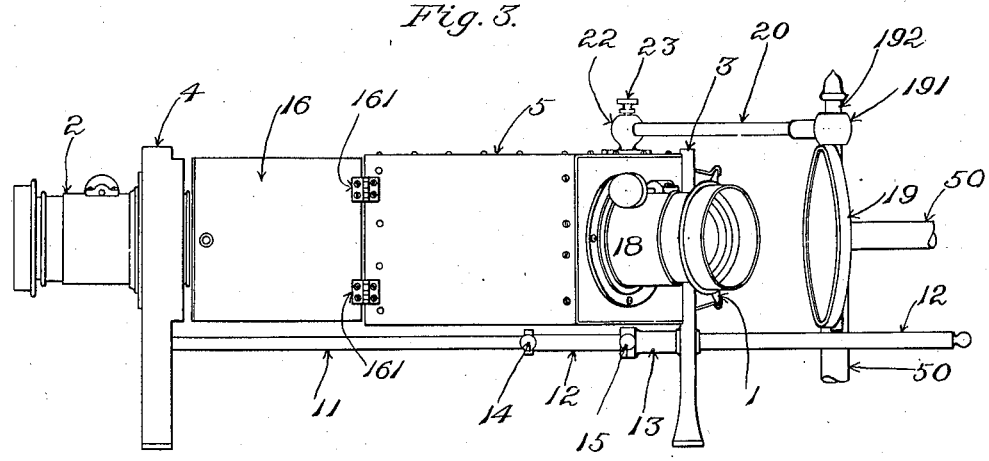
Figure 6:
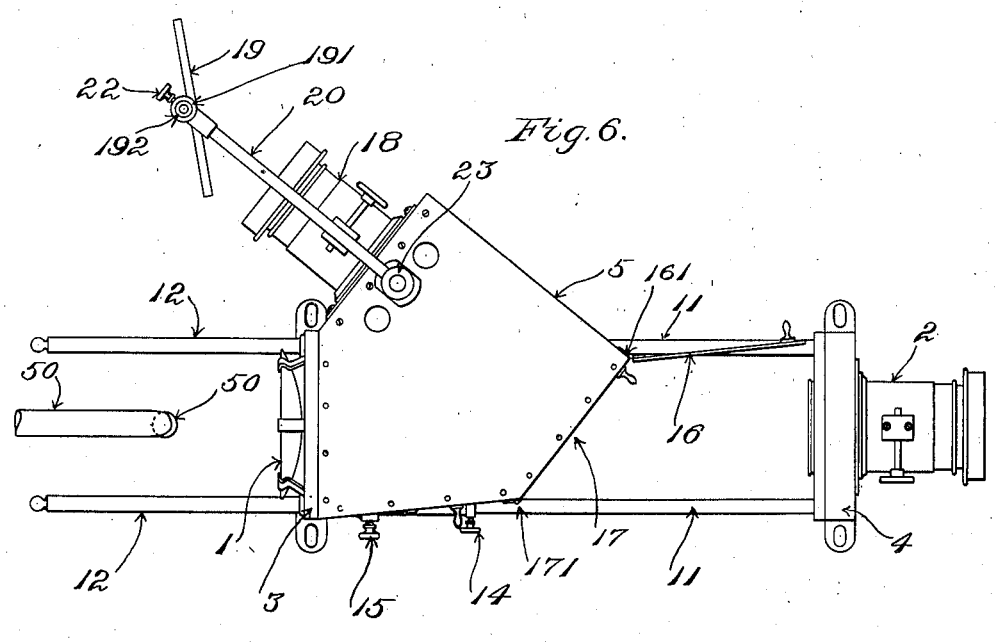
Figure 5:
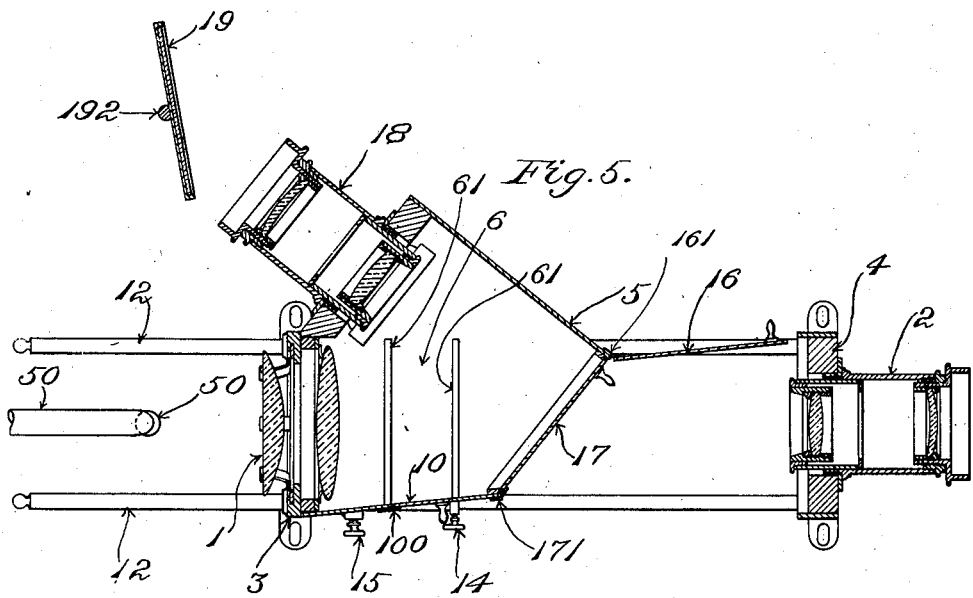

Figure 1 is a side elevation of an optical projection apparatus containing the said embodiment, the said apparatus as represented in this figure being in readiness for projection from a lantern-slide. Fig. 2 is a view in horizontal section on the dotted line 2 2 of Fig. 1. Fig. 3, Sheet 2, is an elevation of the apparatus, viewing the side of the latter which is opposite that shown in Fig. 1. Fig. 4, Sheet 2, is a view similar to Fig. 1, showing the apparatus in readiness for projection from a photograph or other opaque optical material. Fig. 5, Sheet 3, is a view in horizontal section on the plane indicated by the dotted line 5 5 in Fig. 4. Fig. 6, Sheet 3, shows in plan the apparatus arranged as in Fig. 4.

In the drawings, at 1 is represented a compound condenser-lens or condenser-lens system, and at 2 is a compound objective-lens or objective-lens system.

At 50 50 are shown the carbons of an electric-arc lamp, the said carbons being disposed at right angles to each other, with one of the said carbons extending lengthwise in the line of the axis of the condenser-lens. The form of electric-arc lamp in which the carbons are thus arranged is well known in the market. Any other lamp suitable for the purpose, electric or otherwise, may be employed in practice, or a burner of a suitable character, or a mirror disposed at a suitable angle to reflect solar rays through the condenser-lens may in some instances be utilized in the place of a lamp. For convenience of designation I comprehend any one of these various means under the term "source of illumination."

Supporting-stands are shown at 3 and 4. With the first-mentioned one thereof the condenser-lens 1 and certain adjacent parts are connected; with the other thereof the objective-lens 2 is connected. The stand 3 also has attached thereto the casing 5, which latter incloses portion of the condenser-lens system, as indicated by Figs. 2 and 5. Within the casing 5 is provided a slide-stage at 6, Figs. 2 and 5, the latter having in connection therewith opposite guides, as at 61 61, between which may be slid for lantern-slide projection the slide-carrier 7, Figs. 1 and 2, and the lens-holder 8, supporting the supplementary condenser-lens 9. To provide for the insertion of these latter parts into operative position within the casing 5, an opening is formed in one side wall of the latter, a movable door 10 being provided for the said opening, the door 10 being hinged at 100 100, Fig. 4, to the adjoining portion of the said side wall to enable it to be swung into an open or closed position, as desired.

Figs. 1 and 2 show the door swung open, with the slide-carrier 7, lens-holder 8, and lens 9 inserted into position for lantern-slide projection. The remaining figures show the slide-carrier 7, lens-holder 8, and lens 9 removed and the door 10 closed, as required in making use of the apparatus in projecting from opaque optical material—such, for instance, as a photograph. Lens-holder 8 is furnished at its outer end with a plate 81, Figs. 1 and 2, which serves to close the opening in the casing at the said end of the lens-holder. The forward portion of the casing 5 adjacent the objective-lens is formed with an opening 52, as indicated in Fig. 2, to permit the beam of light to pass on its way from the condenser-lens to the objective-lens. Provision is made, as usual in optical projection lanterns, for varying the distance which separates the condenser-lens and objective-lens from each other, as necessary in focusing for lantern-slide projection. Thus stand 4 has connected therewith a pair of horizontal rods 11 11, the said rods, respectively, being located at opposite sides of the two lens systems. The rods 11 11 telescope into tubes 12 12, which latter pass through tubular guides 13 13, which are attached to the stand 3. Clamping-screws 14 15, applied, respectively, to the tubes 12 and guides 13, secure the rods and tubes fixedly together after the stands 3 and 4 have been adjusted to the proper distance from each other.

As thus far described the parts which are employed in lantern-slide projection act essentially as heretofore. The precise construction, &c., is not material to the present invention.

Two holders for photographs or other articles from which reflected images are to be projected are represented at 16 17. The said holders are movable into and out of working position. In the working position of a holder it extends across the opening 52 of the casing 5, as in the case of the holder 17 in Fig. 5. In this position it intersects at an angle the path of the beam of light on the way from the condenser-lens. When a holder is moved out of working position, it is caused to occupy a position at one side of the path of the said beam, as indicated in the case of the holder 16 in Figs. 2, 5, and 6 and of the holder 17 in Fig. 2. The number of the holders, as well as the manner of supporting the holder or holders and providing for the movement of the same into and out of the working position thereof, may vary in practice. In the present instance I have shown two holders, which are hinged, respectively, at 161 161 and 171 171 to the casing 5 at opposite sides of the opening 52. As shown in Fig. 2, both holders may be swung back into inoperative positions at the same time to enable the apparatus to be used for lantern-slide projection or the like, or in projecting the images of opaque objects first one holder may be swung into operative or working position, as in the case of the holder 17 of Fig. 5, and then the other. The purpose of employing a plurality of holders is to enable a quick change to be effected when necessary—as, for instance, by swinging the holder 17 out of operative position and the holder 16 into operative position, and vice versa. While one holder occupies the position of holder 17 in Fig. 5 a picture or other article or object may be applied to the other, or that which previously was connected with the latter holder may be replaced by another, and so on. In the working position of a holder it intersects the path of the beam of light at an angle of forty-five degrees. The secondary objective-lens or objective-lens system is shown at 18. It coacts with the holder which is in working position and serves to project the image of the picture or other article or object which is attached or applied to the said holder. The said secondary objective-lens is applied to an opening in a side wall of the casing 5 opposite and in line with the opening 52. The axis of the said secondary objective-lens extends at right angles to the plane of the object-holder which occupies its operative position. (See Fig. 5.) At a suitable distance to the exterior of the secondary objective-lens 18 is located the mirror 19. This mirror may be omitted, if desired; but in such case in order to throw the images from the respective object-lenses 2 and 18 alternately upon the same screen it will be necessary to reverse the position of the apparatus by communicating approximately a half-rotation thereto at the time of making each change from one kind of projection to the other. The mirror 19 enables the images from the secondary objective-lens to be thrown forward in practically the same direction as the image from the main objective-lens. It usually is set at a slight angle relative to the axis of the secondary objective-lens in order that the reflection from the mirror may clear the outer end of the casing of the lens. This inclination is comparatively slight, and hence in order to enable the images which are produced by the two different modes of projection to be thrown upon one and the same screen it is necessary simply to swing the apparatus very slightly in changing from lantern-slide projection to opaque-object projection, and vice versa. For the support of the mirror it is furnished with a stem 192, which passes through a socket 191 in the outer end of an arm 20, extending horizontally from the casing 5. The inner end of said arm passes through a socket 21 upon the said casing. By means of the clamping-screws 22 23, applied to the sockets 191 and 21, respectively, the parts may be secured fixedly in the desired positions. Socket 191, stem 192, and clamping-screw 22 enable the mirror to be set at any desired height with respect to the secondary objective-lens. It also enables the mirror to be set at the desired obliquity or inclination in a vertical plane in order to enable the image to be thrown at the required angle. Socket 21, arm 20, and clamping-screw 23 enable the mirror to be adjusted toward and from the secondary objective-lens. When the image of printed matter is required to be projected, the mirror 19 operates to reverse the image, so as to cause the words to extend in the proper direction for being read.

While I have been more or less particular in describing the illustrated embodiment of the invention, yet it is to be understood that the precise construction and arrangement herein shown and described are not in all respects of the gist of the invention in the broader phases of the latter.

I claim as my invention—

1. An optical projection apparatus comprising, in combination, a condenser-lens, a slide-stage, a main objective-lens, an object-holder movable into and out of a position intermediate the said condenser-lens and objective-lens in which it intersects the path of the rays passing from the former toward the latter, and a secondary objective-lens coacting with the object-holder when the latter occupies its operative position intersecting the said path.

2. An optical projection apparatus comprising, in combination, a condenser-lens, a slide-stage, a main objective-lens, an object-holder movable into and out of a position intermediate the said condenser-lens and objective-lens in which it intersects the path of the rays passing from the former toward the latter, a secondary objective-lens coacting with the object-holder when the latter occupies its operative position intersecting the said path, and a reflector receiving the image of the object on said object-holder from the said secondary objective-lens.

3. In an optical projection apparatus, in combination, a source of illumination, a condenser-lens, an object-holder having a working position in which it intersects at an angle to the path of the beam of rays from the condenser-lens, an objective-lens having its axis at right angles to the said working position of the object-holder and coacting therewith, and a reflector receiving the image from the said objective-lens and throwing the same directly onto the screen.

4. In an optical projection apparatus, in combination, a condenser-lens, object-holders respectively located at opposite sides of the path of the beam of rays from the said condenser-lens and alternately movable into a working position intersecting the said path, and an objective-lens coacting with the said object-holders when the latter respectively are in the said working position.

5. In an optical projection apparatus, in combination, a condenser-lens, object-holders pivotally mounted at opposite sides of the path of the beam of rays from the said condenser-lens and alternately movable into a working position intersecting the said path, and an objective-lens coacting with the said object-holders when the latter respectively are in the said working position.

6. An optical projection apparatus comprising, in combination, a condenser-lens, a slide-stage, a main objective-lens, object-holders respectively located at opposite sides of the path of the beam of rays from the said condenser-lens and alternately movable into a working position intersecting the said path intermediate the condenser-lens and the main objective-lens, and a secondary objective-lens coacting with the said object-holders when the latter respectively are in the said working position.

7. An optical projection apparatus comprising, in combination, a condenser-lens, a slide-stage, a main objective-lens, object-holders respectively located at opposite sides of the path of the beam of rays from the said condenser-lens and alternately movable into a working position intersecting the said path intermediate the condenser-lens and the main objective-lens, a secondary objective-lens coacting with the said object-holders when the latter respectively are in the said working position, and a reflector receiving from the said secondary lens the image of the object on the object-holder which is in the working position.

In testimony whereof I affix my signature in presence of two witnesses.

ALBERT T. THOMPSON.

Witnesses:
   CHAS. F. RANDALL,
   EDITH J. ANDERSON.